Oct. 5, 1965  G. T. RANDOL  3,209,658
MANUALLY-ADJUSTABLE REACTIVE PRESSURE CONTROL
FOR BRAKE BOOSTER MOTORS
Filed Oct. 9, 1962  9 Sheets-Sheet 1

Inventor

Oct. 5, 1965 G. T. RANDOL 3,209,658
MANUALLY-ADJUSTABLE REACTIVE PRESSURE CONTROL
FOR BRAKE BOOSTER MOTORS
Filed Oct. 9, 1962 9 Sheets-Sheet 3
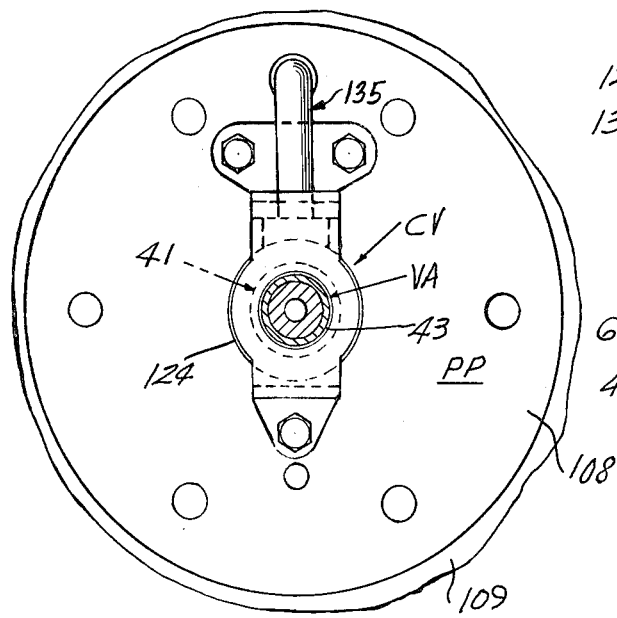
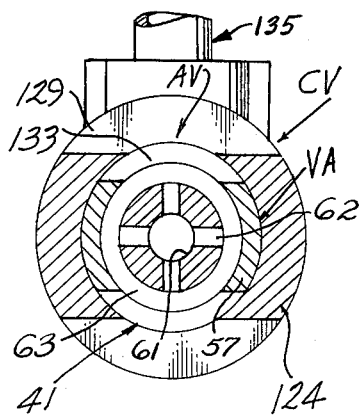
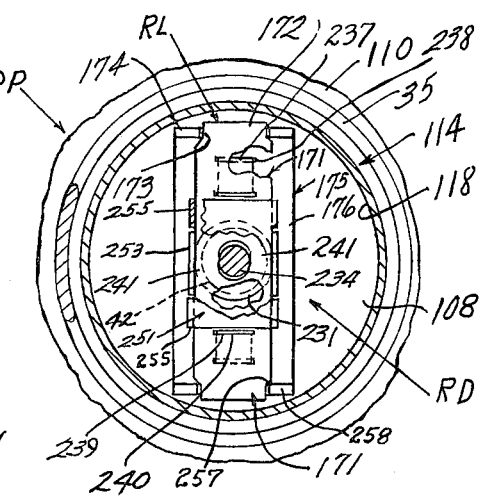
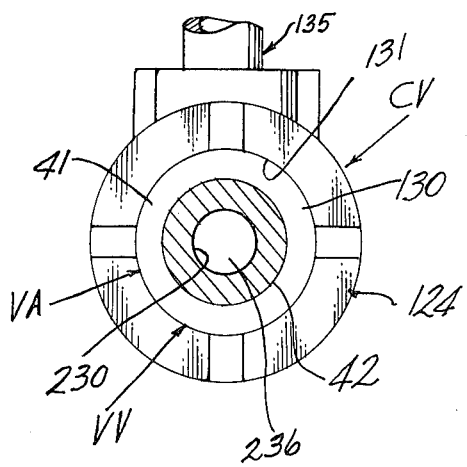
Inventor

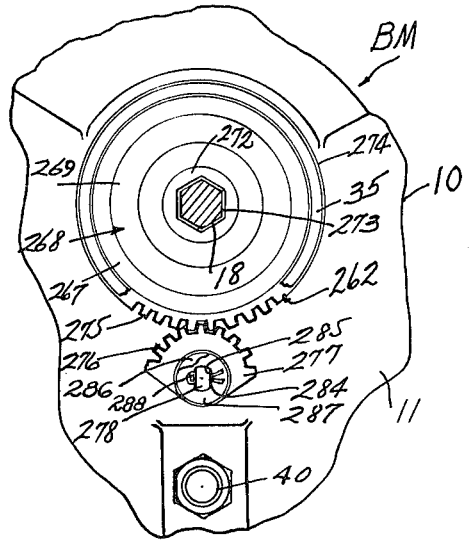

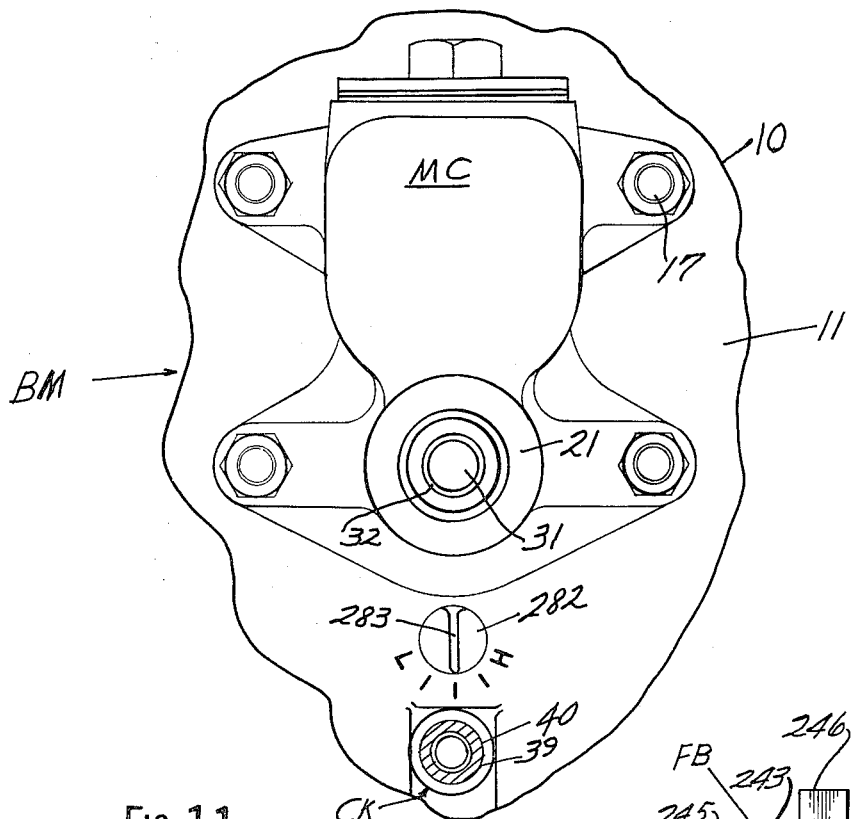
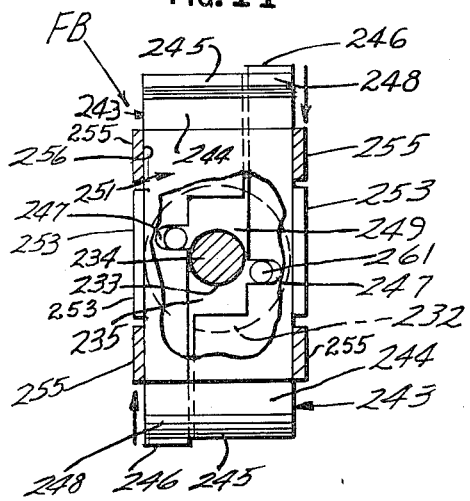
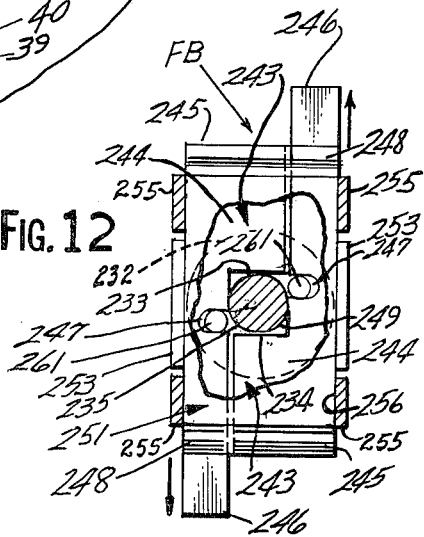

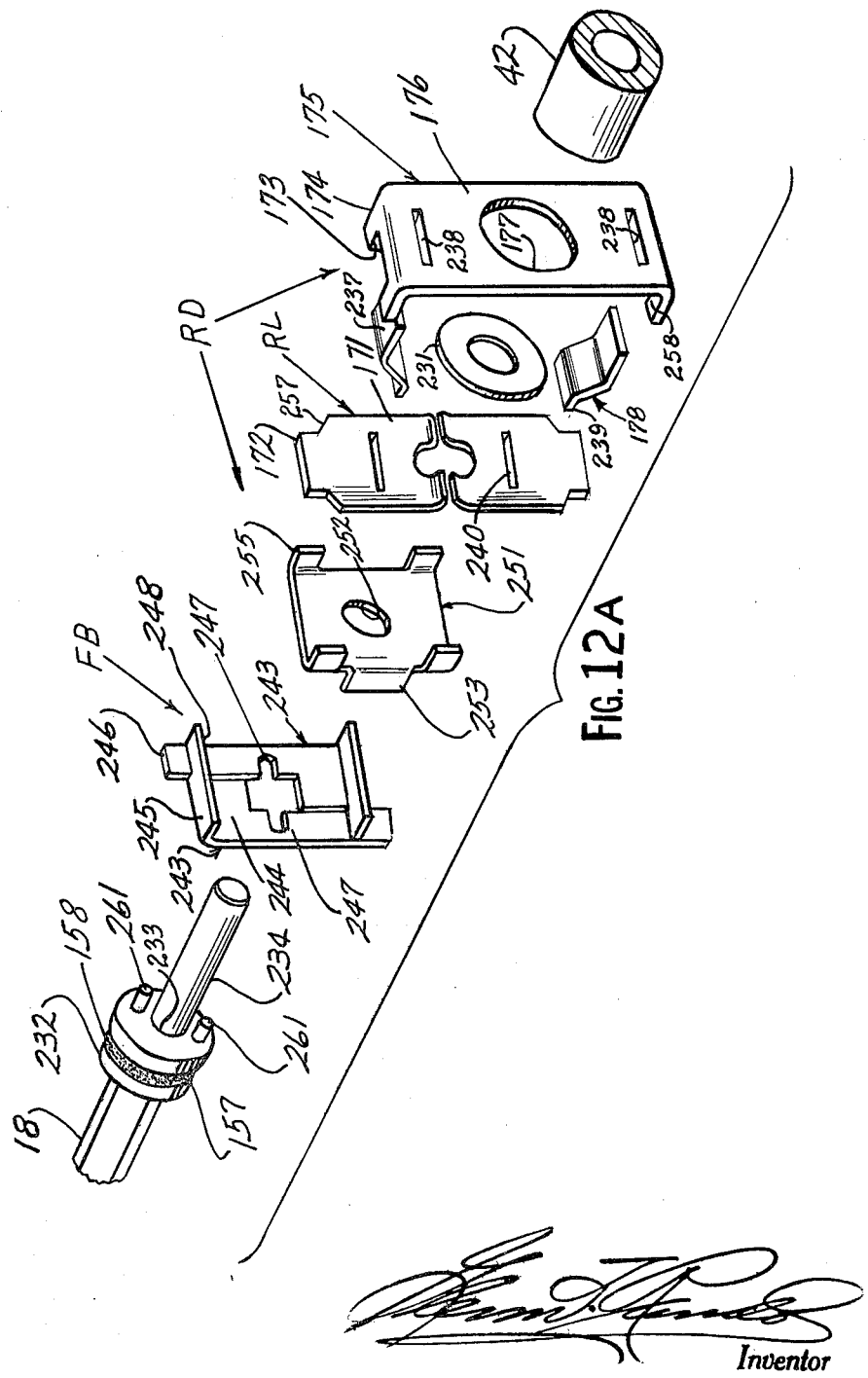

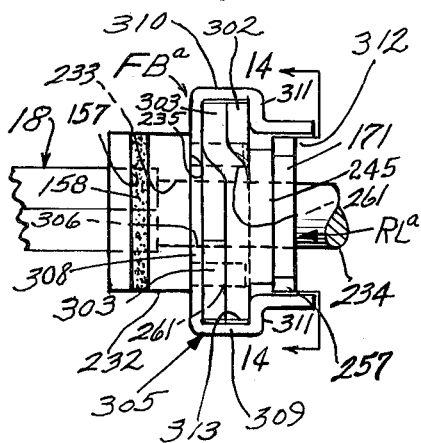
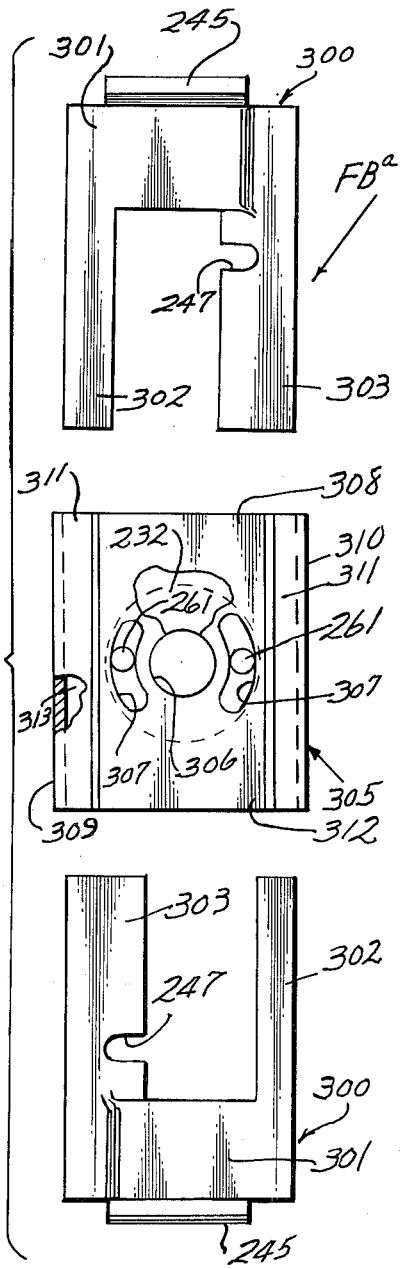
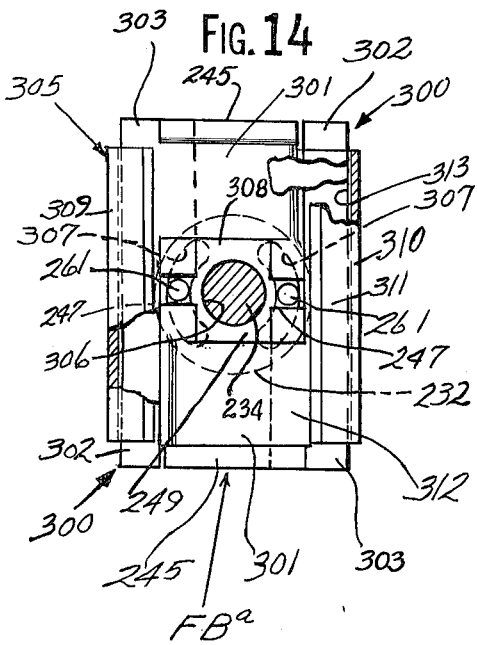

Oct. 5, 1965  G. T. RANDOL  3,209,658
MANUALLY-ADJUSTABLE REACTIVE PRESSURE CONTROL
FOR BRAKE BOOSTER MOTORS
Filed Oct. 9, 1962  9 Sheets-Sheet 8

Inventor

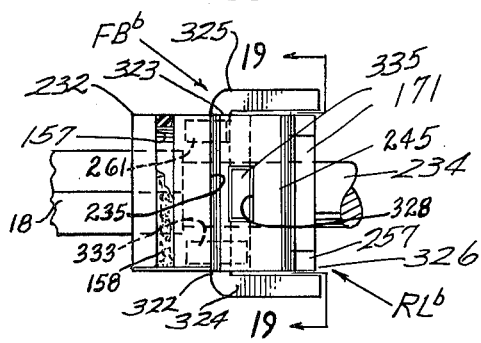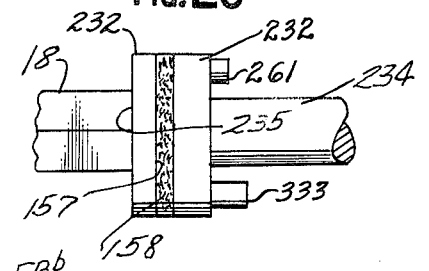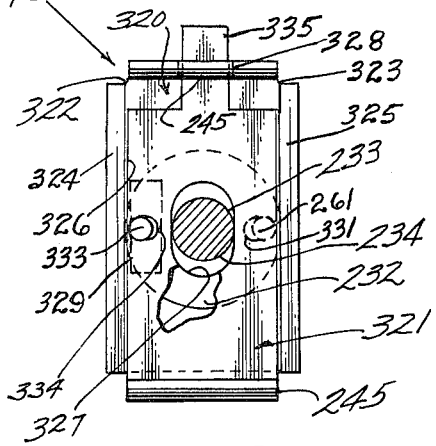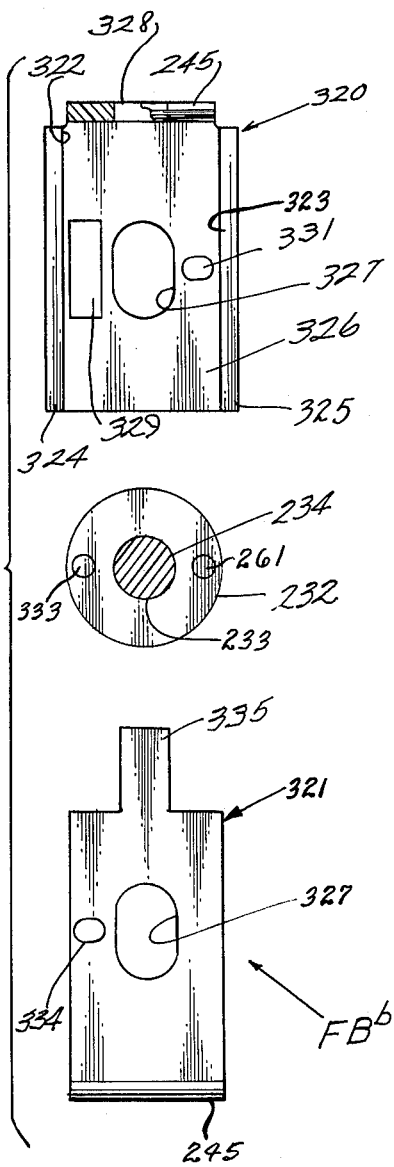

United States Patent Office 3,209,658
Patented Oct. 5, 1965

3,209,658
MANUALLY-ADJUSTABLE REACTIVE PRESSURE
CONTROL FOR BRAKE BOOSTER MOTORS
Glenn T. Randol, 3 E. 2nd Ave., Loch Lynn,
Mountain Lake Park, Md.
Filed Oct. 9, 1962, Ser. No. 229,454
22 Claims. (Cl. 91—369)

This invention relates generally to brake booster mechanisms incorporating a pressure differential motor for assisting in the actuation of the master brake cylinder of the conventional hydraulic brake system on motor vehicles or the like, and more particularly to novel manual means for selectively establishing different ratios in the reaction device of such motors to provide a range of pedal control from light to heavy to custom fit pedal pressure to driver's choice and/or braking system, thus enabling the establishment of a division of work between the motor and driver conducive to predictable braking control for safety in operating the brakes.

In the power-brake art, workers have thus far failed to fully appreciate that oversensitivity, that is, lack of predictable control, continues to be the real deterrent to wide acceptance of power-braking by the motoring public. Only automobiles in the luxury class have thus far standardized power-braking. In order to provide some degree of control, most power-brake manufacturers have resorted to lowering the pedal pad close to the toe board substantially in the same plane as the accelerator pedal when released, thus sacrificing useful mechanical advantage conventionally provided for operating the master cylinder directly from the pedal alone. Such limitation in the purchase between the pedal and master cylinder not only defeats predictable braking control but also renders power-braking hazardous in the event of power failure due to the driver having to rely on insufficient leverage to bring about an effective application of the brakes.

Therefore, the primary object of my invention seeks to provide new and novel means for manually establishing the effective ratio within the reaction-transmitting device so that the work between the driver and booster motor can be proportionally divided to produce the desired "pedal-feel" for prevention of the aforementioned oversensitivity without sacrificing "safety" mechanical advantage between the pedal and master brake cylinder.

An object importantly related to the above primary object, is the novel utilization of selective settings of the reaction device for different makes of cars, thus enabling the adjustable reaction device to control the amount of reaction to the driver in accordance with the type of brake system employed on each line of cars, that is, whether such system is the servo-type in which a percentage of the braking action is generated by the rotating wheels to be braked, or systems wherein all of the braking action is produced by the driver and booster unit, or the driver alone in case of failure of the booster unit.

A more specific object related to the primary object above, is to incorporate said novel ratio-changing means in a lever-type reaction system, wherein a dial provided with a pointer is rotatably mounted on the exterior of the booster cylinder, and which is manually settable selectively to a plurality of graduations impressed in an arcuate pattern radially spaced from said pointer on said cylinder, to change the effective ratio by varying the fulcrum point in said lever system, and thereby producing light to heavy pedal-control over the operation of said booster motor.

In a still more specific sense, my invention seeks to provide a pedal-feel selector which features a novel adjustable two-lever reaction mechanism between the master cylinder push-rod and power member of the booster motor, and which includes a composite fulcrum assembly having two complemental elements, one for each lever, characterized by five adjustments relative to their respective levers to custom fit reactive pressure on the brake-pedal to suit the driver from light to heavy feel, such adjustments being effected by manually rotating said dial which in turn imparts rotational movement to the booster push-rod, when the brake-pedal is released, and thereby displaces the fulcrum elements away from each other for lighter pedal feel and toward each other for heavier pedal feel.

Another important advantage provided by the aforesaid novel pedal-feel selector is that any power-brake unit which reaches the car dealer's floor as original equipment, or when such units are installed by the dealer, can be adjusted without dismantling the unit, or otherwise changing the working parts of the reaction device to suit the particular customer's choice as to the degree of pedal-feel he desires for his power-brake unit. Even the car owner himself can make such adjustments after taking delivery of his new car, so that all members of the family who drive may have a compromised setting of pedal-feel, to gain the maximum of pleasure and safety afforded by power-braking.

With these and other objects and advantages in view, the invention consists of the new and novel combinations, constructions, and arrangements of the parts as hereinafter more fully described, set forth in the claims appended hereto, and disclosed in the accompanying drawings forming part hereof, wherein:

FIGURE 2 is a transverse section taken along the line 2—2 of FIGURE 1 showing the right side of the motor power-piston assembly and associated portions of the control valve;

FIGURE 3 is another transverse section taken on an enlarged scale along the line 3—3 of FIGURE 1 showing details of the vacuum inlet and air passage system incorporated in the control valve;

FIGURE 4 is another transverse section taken on an enlarged scale along line 4—4 of FIGURE 1 showing the forward end of the control valve and associated plurality of vacuum transfer cross-slots indented in the forward end of the outer valve element;

FIGURE 5 is another transverse section taken along the line 5—5 on the same scale of FIGURE 1 and showing the central portion of the left side of the power-piston assembly and associated lever-type reaction-transmitting means;

FIGURE 6 is another transverse section taken on an enlarged scale along the line 6—6 of FIGURE 1 showing particulars of the composite fulcrum assembly for the reaction levers;

FIGURE 7 is a plan view of the adjustable reaction device on the same scale as FIGURE 6 taken from the line 7—7 of FIGURE 1;

FIGURE 8 is another transverse section taken along the line 8—8 on the same scale of FIGURE 1 and showing particulars of the gear-drive connection between the selector dial and push-rod of the master cylinder;

FIGURE 9 is a front elevation of the booster motor showing the master cylinder, and the manual selector dial for changing pressure reaction on the brake-pedal, the center line positioning of the dial pointer corresponding to the FIGURE 6 adjustment of the fulcrum elements;

FIGURE 10 is an exploded view of the elements comprising the adjustable fulcrum assembly;

FIGURE 11 is a view similar to FIGURE 6 but showing the fulcrum elements adjusted for lighter pedal operation;

FIGURE 12 is another view similar to FIGURE 6 but showing the fulcrum elements adjusted for heavier pedal operation;

FIGURE 12A is an exploded perspective representation of my novel adjustable reaction mechanism with its fulcrum elements adjusted for heavier pedal feel;

FIGURE 13 is a plan view on an enlarged scale of a modified form of the composite fulcrum assembly;

FIGURE 14 is a transverse section taken along the line 14—14 of FIGURE 13 to show particulars of the pin-and-slot connections between the two fulcrum elements and inner end of the master cylinder push-rod, which effect relative radial adjustments of said elements in response to limited rotational movements of the push-rod;

FIGURE 15 is an exploded view of the modified fulcrum assembly of FIGURE 13 to clarify the construction of the included parts;

FIGURE 18 is a plan view on an enlarged scale of another modified form of the composite fulcrum assembly;

FIGURE 19 is a transverse section taken along the line 19—19 of FIGURE 18 to show particulars of the pin-and-slot connections between the master cylinder push-rod and fulcrum elements, for converting rotational movement of the push-rod into relative rectilinear movements of said elements;

FIGURE 20 is a plan view on an enlarged scale of the push-rod rotated element which carries a pair of diametrically opposed actuating pins of different lengths, for the fulcrum elements depicted in FIGURE 18; and FIGURE 21 is an exploded view of the elements comprising the modified fulcrum assembly shown in FIGURE 18.

This invention has particular use and value in connection with motor vehicles or the like having one of the known forms of booster brake systems, and therefore, adaptable for use in brake boosters other than the particular type exemplarily disclosed herein to demonstrate the present invention. It further has particular adaptation to such vehicles wherein the master brake cylinder is mounted on the firewall in the engine compartment.

It will be understod from the description to follow that the cycle of operation and various features of the mechanism are clearly adaptable to assemblies other than the foregoing. This cycle relates to the energization and release of a booster unit under personal control to perform work supplemented by such personal control, and wherein personal control alone is operative to perform such work in the event the booster unit becomes inoperative.

Figure 1:
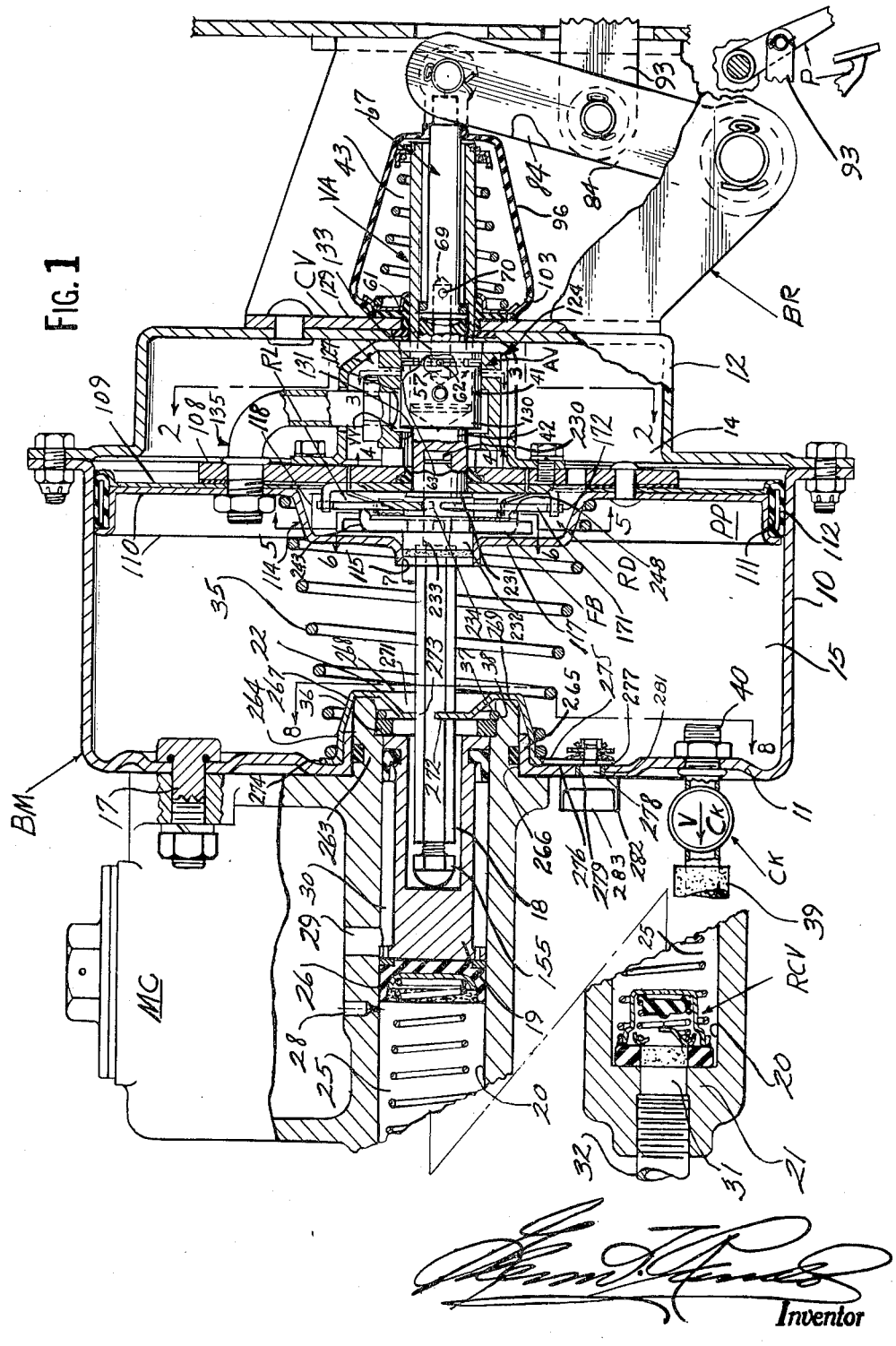
FIGURE 1 is a longitudinal-vertical section of a pressure differential operated booster motor embodying my novel adjustable reaction device, the parts being shown in normal intermediate positions, corresponding to the center line setting of the manual selector dial.

In the illustrated embodiment of my invention, the booster unit serves to operate in part the master brake cylinder in the conventional hydraulic braking system on automotive vehicles and the like as shown in FIGURE 1, wherein my invention is applied to the conventional automobile having a suspended-type pedal assembly.

Like reference characters designate like parts in the several views. Reference in the presnt application to any of the parts or assemblies disclosed in my prior application Serial No. 225,427 filed September 21, 1962, now issued to Patent No. 3,209,657 dated October 5, 1965, will be identified by the same reference characters used therein with capital letter characters in the modified views distinguished, however, by exponents "a," "b," etc. New parts and assemblies disclosed in the present application will be designated by new reference characters with the reference numerals in a higher series than used in my prior application.

Reference is now made to the drawing wherein there is disclosed my novel manually adjustable reaction-transmitting mechanism (device or assembly) generally designated "RD" and which forms the subject matter of the present application. This novel reaction device is shown in operative association with a pressure differential operated booster motor "BM" of the general character disclosed in Patent No. 3,209,657 dated October 5, 1965, above-mentioned. In order to incorporate the structure forming the subject matter of the present application, certain novel changes were necessary in the construction of the forward reduced end portion 42 of the inner valvular portion 41. This portion is now processed with a blind axial bore 230 (see FIGURES 1, 1A and 12A) in lieu of the cross slot 163 disclosed in my prior application. The forward end of the reduced portion is adapted to act via a thrust washer 231 on the inner end of the reaction levers 171, and the opposite (outer) end portion of said valvular portion being connected to the push-rod 67, the pair of upstanding arms 84 pivoted on the mounting bracket "BR," and link 93, to the suspended-type brake pedal "P" for actuation thereby as shown in FIGURE 1.

Reference may be had to my above-identified Letters Patent for a more detailed understanding of the construction and operation of the booster motor BM, and therefore, only those parts which have undergone change will be described in detail with due consideration given to their function and coaction with the components comprising the booster motor BM and the novel adjustable reaction-transmitting device RD embodied therein.

The booster motor BM will be referred to in broader terms as a "power unit," and comprises: a cup-shaped casing or cylinder 10 having an integral end wall 11, and a detachable cup-shaped member (wall) 12 closes the open end of the cylinder as shown. A power assembly specifically disclosed herein as a power-piston "PP," is reciprocably mounted within said power cylinder and moves from a normally released position shown in FIGURES 1 and 1A, said power assembly being preferably of the solid-piston type as distinguished from the flexible-diaphragm types. The power assembly which for flexibility in terminology in describing and claiming the invention, will be referred to as a "power-piston," "power member," "wall," or "pressure-responsive unit," divides the interior of the power cylinder 10 into a variable pressure (air-vacuum) chamber 14 and a constant negative pressure (vacuum) chamber 15, both of said chambers being normally balanced at negative level pressure when the power-piston PP is in normal position as shown in FIGURE 1, thus the present booster motor BM is designated in the industry as the vacuum-suspended type as distinguished from the air-suspended types characterized by equivalent atmospheric pressure conditions in both chambers when the booster motor is de-energized. The conventional master brake cylinder designated "MC" is provided on the exterior of the end wall 11 of the power cylinder 10 and is sealed airtight thereagainst by means of a plurality of bolts 17 securing the mounting flange to said wall as shown, said master cylinder being adapted to supply pressurized brake fluid to the vehicle brake system to actuate the same.

Therefore, the booster motor BM combines with the aforesaid master cylinder MC to produce in a unitary assembly the booster brake mechanism as shown in FIGURE 1.

The power-piston PP actuates an output or work-performing member disclosed herein as an elongated push-rod 18 of hexagonal cross section. The forward end portion of said push-rod projects into engagement with the bottom of a cavity in a spool-type hydraulic piston 19 slidably disposed in a longitudinal bore 20 formed in the master cylinder body, said bore being closed at its forward end 21 and open at its opposite (rear) end 22 whereby coaction between the piston 19 and power-piston PP effectuates the major portion of the working pressure on the brake fluid in a variable volume working chamber 25 disposed between the closed end 21 of said bore 20 and the confronting fluid-retaining head 26 terminating the forward end portion of the hydraulic piston 19, to supply brake actuating fluid under pressure to the brake system of the motor vehicle as is understood.

Incorporated in the body of the master cylinder MC is a fluid supply reservoir 27 positioned above the bore 20 to supply fluid under gravitational force thereto, via a compensating port 28 controlled by the head of the piston 19. An inlet port 29 spaced from said compensating port, is in continuous communication with an annular fluid chamber 30 encircling said piston 19 to enable adjustment of fluid volume in said working chamber 25 thereby accommodating full release of the vehicle brakes without the possibility of cavitating the brake lines.

Operation of the master cylinder MC is conventional in all respects with the working fluid being discharged through an outlet 31, and the conventional residual pressure check-valve "RCV," into the pressure lines 32 leading to the wheel cylinders (not shown) provided in the brakes (not shown) for each of the wheels of the motor vehicle.

The conventional conical-type compression return spring 35 reacts between the residual pressure check-valve RCV and the master cylinder piston 19 to urge the latter toward normally released position shown in FIGURE 1 wherein said compensating port 28 is open (uncovered) to accommodate fluid flow between the working chamber and reservoir aforesaid. The piston 19 when in normally released position as shown in FIGURE 1 abuts a backing washer 36 stabilized adjacent the open end of the bore 20 by a split-retaining ring 37 partially confined in an internal annular groove 38 processed in said bore as shown.

A personally-controlled input member is disclosed herein as a valve carriage or actuator generally designated "VA," and is a counterpart of the actuator disclosed in my prior application, and comprises the inner valvular portion 41, the forward reduced portion 42, and a rearwardly extending tubular portion 43. The forward end portion of the pedal push-rod 67 projects into the tubular portion in pivotal connection therewith whereby pedal movement is converted into rectilinear movement of the valve actuator. The valvular portion slidably interfits the outer valve sleeve 124. The valvular portion 41 is formed with an annular working land 130 and a pair of diametrically opposed transverse air control slots 133 longitudinally spaced from the working land, and the outer valve sleeve 124 which is movable as a unit with said power-piston PP, is formed with an internal annular working face 131 defining the forward end of the vacuum-chamber 128, and a pair of fluid control (air-vacuum) cross slots or channels 129 longitudinally spaced from said working face. The control slots 129, 133 cooperate to produce what may be termed the "atmospheric valve" generally designated "AV," and the working face and land 130, 131, respectively, cooperate to produce what may be termed the "vacuum valve" generally designated "VV."

Actuation of the power-piston PP is controlled by operation of the follow-up control valve mechanism generally designated "CV," to selectively connect one side (variable power chamber 14) of the power-piston to atmosphere, and to the other constant pressure chamber 15 which is continuously charged with vacuum (negative pressure), the latter chamber being connected at all times by a conduit 39 having an interposed check-valve generally designated "CK" and a rigid tubular fitting 40 projecting from the end wall 11 of the power cylinder 10, to a source of vacuum production, such as, for example, vacuum conditions created within the inlet-manifold of an operating internal-combustion engine powering any motor vehicle and the like.

Figure 1A:
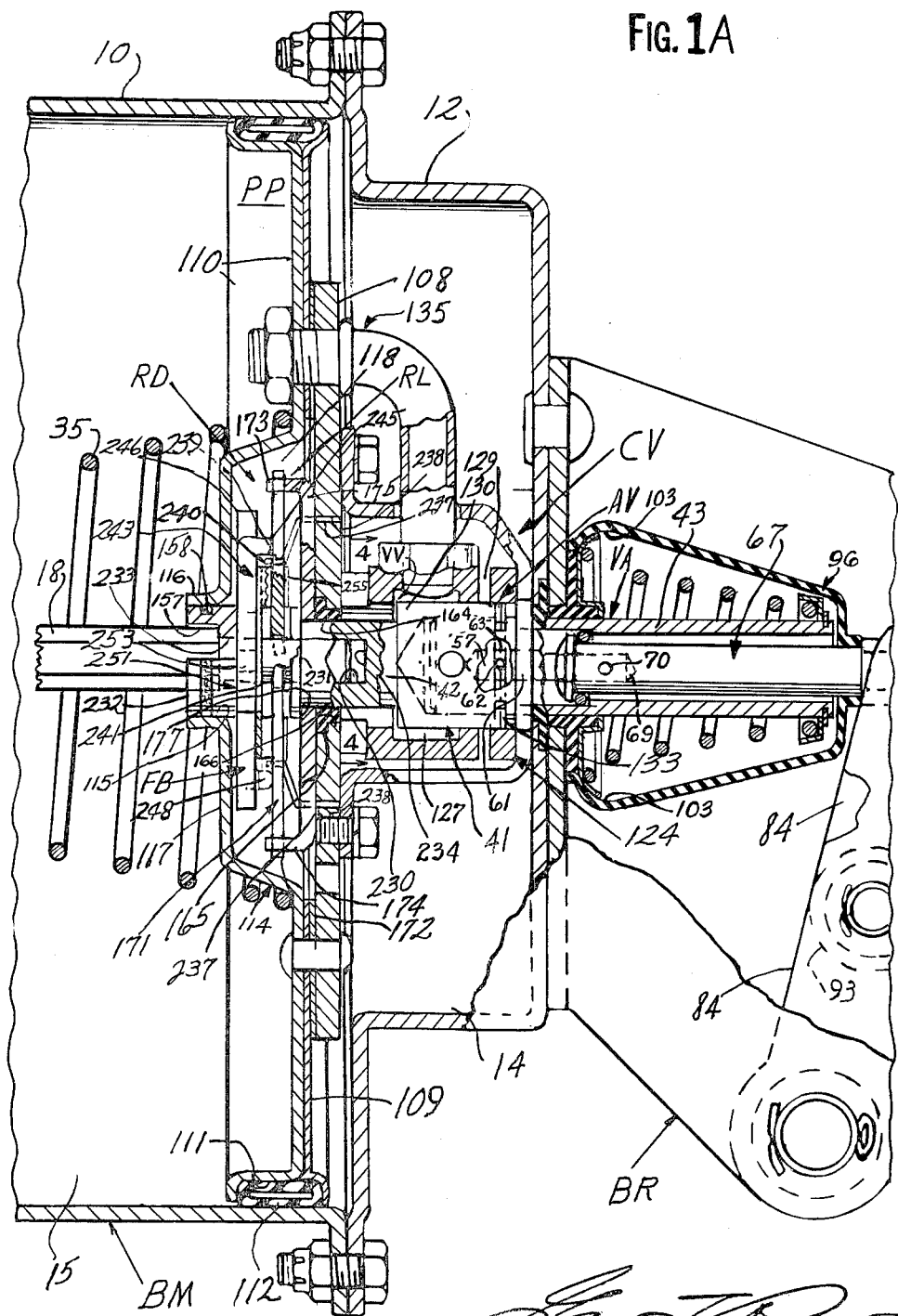
FIGURE 1A is a fragmentary enlargement of FIGURE 1 to clarify the details of my novel adjustable reaction device.

In the normal disposition of the power-piston PP, when the vehicle brakes are "off" as shown in FIGURE 1 and 1A, the working face and land 130, 131, respectively, are spaced from each other thus placing the variable pressure chamber 14 in communication with the constant pressure chamber 15 via the vacuum-chamber 127 and conduit 135, the latter chamber being continuously charged with negative pressure (vacuum) from the aforesaid vacuum source. Under the aforesaid condition, the cooperating air slots 129, 133 are isolated to block communication between the booster chamber 14 and the atmosphere, thus enabling the latter chamber to be charged with vacuum from the chamber 15. Activation of the power-piston PP to operate the master brake cylinder MC to apply the vehicle brakes, is effected by operator movement of the valve actuator VA to the left from normal position, to position the working face and land 130, 131, respectively, in lapping relationship thereby isolating the vacuum-chamber 128 therefore the booster chamber 15 from the booster chamber 14, whereupon, slight additional movement of the valve actuator VA farther to the left, positions the air slots 133 in communication with their cooperating air slots 129 in the outer valve sleeve 124 without interrupting the isolated status of the booster chambers 14, 15. Under such latter conditions, air at atmospheric pressure is admitted to the booster chamber 14 via radial ports 62, external annular channel 63, blind axial bore 61 processed in the interfitting member 57, said channel 63 being intersected by the aforesaid air slots 133, and another blind axial bore 69 processed with intersecting cross bores 70 in the forward end portion of the push-rod 67, said cross bores having continuous communication with the atmosphere through the interior of the tubular portion 43 which opens at its right end to the interior of the dust-excluding boot 96 provided at its left enlarged end with a plurality of atmospheric perforations 103. Admission of air at atmospheric pressure into the booster chamber 14 in the manner just described, creates a pressure differential on said power-piston PP effective to move the latter in a corresponding direction, in response to the degree of movement imparted to the valve actuator VA under operator-actuation relative to said outer valve sleeve and power-piston PP movable as a unit, within said predetermined limits of said actuator.

The power-piston PP is also similar in construction and operation to that disclosed in my prior application, and therefore comprises the circular master plate 108 which backs a juxtaposed first thrust plate 109 of annular configuration, and a secondary support and sealing plate 110, the first and second plates being horizontally flared oppositely, respectively, to terminate their peripheral marginal portions in a short vertically offset end to produce therebetween an annular channel 111 of substantially rectangular configuration with the inner working surface of the power cylinder 10. Fitted into this channel is the hollow ring-like packing 112, the outer peripheral surface thereof engaging the said working surface in the power cylinder to divide the interior of said cylinder into said chambers 14, 15 as is understood.

The secondary plate 110 is formed with the centrally extruded embossment 114 which has a central opening 115 formed by an outturned annularly flanged portion 116 projecting forwardly normal to the forward vertical closure wall 117 of the embossment. A circular chamber 118 is provided between the inner side of the closure wall 117 and confronting side of the master plates 108 which serves to house my improved adjustable reaction-transmitting device RD best shown in FIGURE 12A exploded perspective.

The booster push-rod 18 has its adjustable forward end portion 155 in engagement with the end wall of the cavity in the master cylinder piston 19, and the opposite rear end portion of said push-rod seats in a hexagonal cavity formed in an enlarged diameter cylindrical thrust-transmitting member 232, the hexagonal cavity being of less depth than the thickness of said thrust member. A cylindrical hole 233 coaxial with said hexagonal cavity extends from the bottom thereof to the opposite side of said thrust member, and an elongated reduced diameter cylindrical extension 234 which terminates the rear end of said push-rod passes through said hole as shown in FIGURES 1 and 1A. The thrust member 232 is provided with an external annular groove 157 fitted with a complemental packing 158, and projects in airtight sealed relation into the opening 115 of the reaction chamber 118 aforesaid.

The extension 234 produces with the thrust member 232 an annular working shoulder 235 defining the right face of said thrust member as shown in FIGURES 1 and 1A. That portion of the extension 234 which extends to the right of said thrust member through chamber 118, is slidably received in and supported by the blind axial bore 230 in the reduced portion 42 of the inner valvular portion 41, in normally spaced relation to the end wall 236 of said bore. This spacing accommodates the required relative movement of the valvular portion 41 relative to the outer valve sleeve 124 to produce follow-up actuation of the control valve CV as is understood, to control operation of the booster motor power-piston PP. The forward end of the reduced portion 42 of the valve actuator VA is adapted to slide between predetermined limits in a complemental aperture 164 formed through a preferably flanged plastic bearing element 165 incorporated in a central recessed opening 166 in the master plate 108 as shown. When the right end of the push-rod extension 234 is brought into engagement with the end wall 236 of the axial bore 230, which takes up all of the relative movement between the push-rod 18 and valve actuator VA, operator force may be transmitted directly to the booster push-rod 18 to operate the master brake cylinder MC "straight through" in cooperation with or independently of booster assist.

Movement of the valve actuator VA under operator-actuation is transmitted to the booster push-rod 18 through a reaction lever assembly generally designated by the reference character "RL," said assembly being wholly contained within the reaction chamber 118. The lever assembly comprises a plurality of levers, preferably two levers in diametrically opposed relation as shown in FIGURES 1, 1A and 5, of radially disposed levers 171 having their outer narrowed ends 172 projecting into a slot 173 provided in each of the opposite horizontal flanges 174 defining opposite ends of a pressure transmitting U-shaped member 175 juxtaposed with respect to the left side of the master plate 108 within said reaction chamber, for movement as a unit. The central portion of the vertical segment 176 contiguous to said master plate 108 being apertured at 177 through which the forward reduced portion 42 of the valve actuator VA passes from the coaxial aperture in the bearing 165 aforesaid, into the chamber 118 as shown in FIGURES 1 and 1A. A flat spring 178 with oppositely disposed horizontal offset end portions is angularly positioned between each of the reaction levers 171 and left side of the vertical segment 176, with its upper horizontally disposed portion 237 projecting into a rectangular opening 238 in said segment, and the lower end of said spring terminates in a similarly disposed portion 239 which projects into a rectangular hole 240 provided in each of the reaction levers 171. These connections between the opposite ends of each of the flat springs with the levers and segment serve to stabilize them in correct operating relation, and to react to yieldably position the reaction levers in substantially normal vertical position as shown. The inner offset ends 241 of the levers are slotted as shown in FIGURE 5 to straddle mount the push-rod extension 234, and the aforesaid thrust washer 231 is normally disposed as shown in FIGURES 1 and 1A, slightly spaced from the extreme ends of the offset end portions of the reaction levers, however, this spacing may be eliminated so that the thrust washer normally abuts said offset ends. Where the spacing is provided, the control valve CV may be timed to open thus energizing the booster motor BM, so that reaction from the master cylinder MC is transmitted to the valve actuator VA therefore the pedal P after initial pressure is produced in the hydraulic brake system, but if such spacing is eliminated, then initial movement of the valve actuator VA under operator-actuation simultaneously produces slack take-up in the hydraulic brake system immediately in synchronism with operation of the control valve CV to produce power-assist. In the former case, the booster motor BM effects initial pressurizing of the brake fluid to take up the slack in the brake system, while in the latter arrangement, the operator and booster motor BM jointly operate the master cylinder MC to initially pressurize the brake fluid to take up such slack even to the extent of applying the wheel brakes lightly if so desired.

A composite fulcrum assembly or block generally designated "FB" (see FIGURE 12A) is operatively positioned contiguously to the working shoulder 235 on the thrust member 232 as shown in FIGURES 1 and 1A. This fulcrum block comprises a pair of complemental plates 243 radially movable relatively in the same plane from and toward the axis of the push-rod extension 234, each of these plates being L-shaped configuration and formed with a normal width rectangular base segment 244 having a horizontal flange 245 normal thereto and defining its outer end, and a narrow elongated rectangular extension 246 provided with a cutout (slot) 247 indented in the inner vertical edge thereof, the outer vertical edge of which being flush with the lateral vertical edge of the base segment best demonstrated by FIGURES 6 and 10, and corresponding end of said flange 245 with an opposite end portion 248 of the latter overlying the inner lateral edge of the normal width segment, all as shown in FIGURES 6 and 10. In the normal assembled status of the fulcrum block FB as shown in FIGURE 6, the pair of fulcrum plates 243 produces an elongated rectangular opening 249 therebetween which changes in length as shown in FIGURES 11 and 12, and through which the push-rod extension 234 passes, said opening being substantially the same width as the diameter of said extension, and opposite ends thereof are normally spaced from opposite sides, respectively, of said push-rod extension. The aforesaid cutouts 247 in the inner lateral edge of the narrow extensions 246 which define the adjustable length of said opening 249 as will appear, are disposed in confronting relation, one on each side of said extension 234. The free end portion of each extension 246 projects under the flanged overlying portion 248 on the other fulcrum plate to interlock said plates 243 in a thrust-receiving direction, said plates being slidably stabilized laterally by means of a guide plate 251 of similar rectangular configuration best shown in FIGURES 7, 10 and 12A. This guide plate is positioned between the rear side of the fulcrum plates 243 in contiguous relation thereto, and the forward side of the pair of reaction levers 171 best shown in FIGURE 1A. The guide plate proper is provided with a central hole 252 with the lateral edges of this plate defined by a pair of spaced intermediate flanges 253 which provide a channel 254 for slidable reception of said fulcrum plates 243, and oppositely projecting pairs of spaced upper and lower flanges 255 which provide a channel 256 in which said reaction levers 171 rock. These upper and lower pairs of spaced flanges also serve to stabilize the operative relationship of the reaction levers with respect to the fulcrum block FB slidable between the pair of flanges 253. Also the slots 173 in the power-piston pressure flanges 174 through which the narrowed outer ends 172 of these levers project, and the straddle mounting of the inner offset ends of said levers on the push-rod extension 234, cooperate with the guide plate 251 to maintain the fulcrum block and levers in alignment as shown in FIGURE 6. It should also be noted the angular shoulders 257 (see FIGURES 7 and 12A) provided at the juncture of the normal and narrow widths of the reaction levers 171, serve to prevent fortuitous radial displacement of these levers, by engaging portions 258 of the flanges 174 defining opposite ends of the slots 173, respectively. Thus, the guide plate 251 cooperates with the pair of fulcrum plates 243 to maintain them in correct relation for rectilinear movements away from and toward each other to change the fulcrum point therefore the effective ratio of the reaction levers to produce light to heavy reaction, respectively, on the valve actuator VA therefore the pedal P.

The thrust member 232 carries on its right face a pair of diametrically opposed horizontally extending pins 261, one on each side of the extension 234, and which in the assembled status of the fulcrum block assembly FB, cooperate with the cutouts 247, respectively, whereby rotational movement imparted to the booster push-rod 18 moves the pair of fulcrum plates 243 rectilinearly in opposite directions away from and toward each other (see FIGURES 11, 12 and 12A), such movements being manusually effected by the operator when the pedal P is in normally released position as shown in FIGURE 1, to establish the fulcrum flanges 245 in the desired relative position with respect to the axis of the booster push-rod 18 to produce the desired pedal "feel."

The means for manually effecting the ratio changes within my novel adjustable reaction-transmitting device RD are best demonstrated in FIGURES 1, 8, 9 and 12A and comprise a substantially cylindrical cup-shaped rotatable member 262 partially supported on the rearwardly extending hub portion 263 of the master cylinder bore 20, the horizontal cylindrical portion 264 of the wall of the rotatable member 262, which defines the open end thereof, is rotatably mounted on the inturned annular flange 265 defining the central opening 266 in the end wall 11 of the power cylinder 10. This horizontal wall portion merges with a tapering portion 267 which is integral with the end wall 268 of member 262. This latter end wall is formed with a vertical peripheral marginal portion 269 formed with a conical concavity 271 having a vertical bottom wall 272 provided centrally with a hexagonal aperture 273 through which the booster push-rod 18 of similar cross sectional configuration passes, to provide a connection between the rotatable member 262 and push-rod 18 enabling co-rotational movement thereof. The open horizontal end portion of the rotatable member 262 is defined by an annular outturned flange 274 which is disposed in engagement with the confronting annular face portion on the end wall 11 adjacent the inturned flange 265, said flange being adapted to receive reaction from the power-piston return spring 35 as shown in FIGURE 1 whereby said rotatable member 262 is stabilized in its different indexed positions.

A gear segment 275 defines a portion of the lower side of the flange 274 as shown in FIGURE 8, said gear segment being constantly meshed with a gear segment 276 defining the arcuate portion of a sector-shaped plate 277 mounted for co-rotation on a shaft 278 projecting through a bushing 279 pressfitted in a hole 281 through the end wall 11 of the power cylinder 10 (see FIGURE 1). The outer end of said shaft terminates in a cylindrical knob-like dial 282 provided with a finger-piece 283 which also serves as a pointer to facilitate indexing the dial to its five graduations "L" to "H" displayed in an arcuate pattern on the end wall below the master cylinder MC in radially spaced relation to the lower pointing end of said pointer as shown in FIGURE 9. The sector plate 277 is fixed to the inner end of the shaft 278 by means of oppositely disposed flats 284 on the inner end portion of said shaft which project into a complemental aperture 285 in the end of the sector plate 277 opposite its gear segment as shown in FIGURE 8, to thus lock the sector plate to the shaft for co-rotation. A cupped spring washer 286 disposed on the round portion of the shaft adjacent the end wall 11, bears against the sector plate, the latter being backed by a thrust washer 287 also on the round portion of the shaft, to place limited tension on said spring washer to maintain the dial in airtight relation to the marginal portion of the end wall encircling said shaft, and a cotter pin 288 through the end of the flatted portion of said shaft retains the spring and thrust washers assembled under tension, and the assembled status of the dial on the power cylinder as shown in FIGURE 9. Thus, manual rotation of the dial toward "L" position imparts counter-clockwise rotational movement to the cup-shaped member 262 via said gear connection 275, 276 to the booster push-rod 18 thence to the thrust member 232 to displace the fulcrum plates 243 radially away from each other from normal position as shown in FIGURE 6 to the position of FIGURE 11 to produce light pedal operation, and rotation of the dial toward "H" position imparts clockwise rotational movement to the booster push-rod 18 to draw the pair of fulcrum plates 243 toward each other thus producing heavier pedal operation. Thus, the pin and slot connections 261, 247 function to convert rotary motion of the thrust member 232 therefore the booster push-rod 18 into relative radial movements of the pair of fulcrum plates 243.

Each of the settings for the dial as shown in FIGURE 9 changes the position of the flanges 245 by $\frac{1}{32}$ inch from the axis of the push-rod 18, thus the five settings provide a range of fulcrum block positions to custom fit the pedal "feel" to the wishes of the particular driver, and especially to the operational characteristics of the brake system used on the vehicle, that is, whether the system is the servo-type or full braking application effected by the force exerted on the master brake cylinder jointly by the booster motor BM and operator, or the operator alone in the event of booster failure.

*Operation*

In operation, and assuming the relative positions of the parts of my novel adjustable reaction-transmitting device RD, to be as shown in FIGURES 1, 1A, 6, 8 and 9 wherein the booster motor BM is de-energized, that is, the vehicle brakes (not shown) are "off," and the brake-pedal P in normally released position, and the adjustable fulcrum assembly FB in its intermediate position corresponding to the center line position of the dial 282 as shown in FIGURE 9 wherein the flanges 245 on the fulcrum plates 243, respectively, are radially spaced as shown in FIGURE 6.

As previously explained, the inner offset ends of the reaction levers 171 are engageable by the thrust washer 231 for the inner pressure point on said levers, and the outer narrowed ends of said levers bear against the bottom of the slots 173 for the outer pressure point, while an intermediate portion on opposite sides of their respective reaction levers bears on the fulcrum flanges 245 whereby, operator-actuation of the valve actuator VA moves the thrust washer 231 as a unit into engagement with the inner ends of the reaction levers as the valvular portion 41 is displaced relatively to the outer valve sleeve 124 to induce operative energization of the booster power-piston PP to move leftward to actuate the master cylinder piston 19 to pressurize the brake fluid in the hydraulic lines. Upon energization of the booster motor BM, reaction from the master brake cylinder MC is transmitted via push-rod 18, thrust member 232 to the fulcrum block FB and flanges 245 thereof, against the confronting intermediate portions on the reaction levers 171 to rock said levers counterclockwise as viewed in FIGURE 1A, on their pressure points between their narrowed ends and bottom of the slots 173 in the flanges 174. Such rocking movement rotates the inner ends of the reaction levers 171 rearwardly into engagement with said thrust washer 231 therefore applying reaction on the valve actuator VA, pedal push-rod 67 and pedal P to provide the driver with a "feel" of the amount of working being done by the booster motor BM and himself so that such physical awareness can serve him in predicting the amount of pressure he should apply to the pedal P to bring about the barking action required under the circumstances.

If the driver desires to have a lighter or heavier pedal operation to properly control the action of the booster motor BM, such may easily and conveniently be obtained by merely dialing the pointer 283 accordingly, while the brake-pedal P is released as shown in FIGURE 1. Manual rotation of the selector dial 282 changes the radial distance between the outer flanged ends 245 of the fulcrum plates 243. Five settings have been provided from light to heavy pedal "feel," and each setting adjusts the flanged ends 245 of the fulcrum plates 243 by 1/32" with respect to the axis of the booster push-rod 18 therefore the master cylinder MC and booster motor BM. For example, assuming a 1" reaction lever is used, and that the flanges on the outer ends 245 of the fulcrum plates 243 are spaced 1 3/8" as shown in FIGURE 6 when the selector dial 282 is in its center line position as shown in FIGURE 9, which setting corresponds to the generally accepted reaction feel for cars equipped with servo-type wheel brakes, and divides the work approximately 32–68 percent between the driver and booster motor BM. When the fulcrum plates 243 are in their extreme outer positions as shown in FIGURE 11 corresponding to the L setting of the selector dial 282, they are spaced 1½" for a different line of cars not equipped with servo-action wheel brakes which setting divides the work 25–75 percent between the driver and booster motor BM, and with the extreme innermost positions of the flanges effective as shown in FIGURE 12 and 12A, corresponding to the H setting of the selector dial 282, the spacing of the flanges is 1¼" for reaction feel of the brakes for a still different line of cars not equipped with servo-action wheel brakes. This latter setting divides the work 37½–62½ percent between the driver and booster motor BM.

*Modified adjustable fulcrum block assembly*

FIGURES 13, 14, and 15 illustrate a modified form of the fulcrum block assembly "FBa," identified FB in the main embodiment of FIGURES 1–12A inclusive, and wherein the modified assembly comprises a pair of complemental U-shaped members (plates) 300, each being formed with a rectangular base segment 301 having a horizontally flanged portion 245 normal to and substantially coextensive with the outer end thereof best shown in FIGURE 15, and a pair of spaced narrow and wide leg segments 302, 303, respectively, projecting from opposite ends of the inner edge of said base segment. The full outer longitudinal edge marginal portion of the wide leg 303 being offset to enable the narrow leg on the other member to slide thereon past the confronting lateral edge of the base segment in the same plane therewith best shown in FIGURE 13. The aforesaid cutouts 247 are provided in the inner edges, respectively, of each of the wide legs 303 as shown in FIGURES 14 and 15. These cutouts normally lie in confronting relation on opposite sides of the cylindrical extension 234 for reception of the thrust member actuating pins 261 carried on the rear working face 235 on the thrust member 232 in diametrically opposed relation. A rectangular guide member 305 is provided with a central hole 306 through which the extension 234 passes thus acting as a support for this guide member, and on opposite sides of this hole is an arcuate slot 307 through which the pins 261 project, respectively, into engagement with the cutouts 247, said slots being of sufficient length to accommodate the arcuate swing of said pins in imparting rectilinear relative movement to the fulcrum members 300. The aforesaid guide member 305 is positioned between the thrust member 232 and the wide legs 303 on the fulcrum members best shown in FIGURE 13. Thrust applied to the fulcrum block FBa is transmitted through the guide member to the thrust member 232, thence to the hexagonal push-rod 18 to actuate the master cylinder piston 19 in the same manner as described in connection with the main embodiment. The guide member 305 comprises a rectangular vertical segment 308 provided with said hole 306, and opposite edges thereof define rearwardly projecting lateral flanges 309, 310, respectively, said flanges being offset inwardly toward each other at 311 to produce a channel 312 for reception of the pair of reaction levers 171 as shown, and the space between said offset portions 311 and the segment 308 produces a channel 313 for slidably receiving the pair of U-shaped fulcrum members 300 as shown in FIGURE 13. Thus, the guide member serves to maintain correct radial alignment of the two complemental U-shaped fulcrum members 300 in assembled status while the channel 312 between the free offset end portions of the lateral flanges, maintains the reaction levers 171 in correct operative relationship to the fulcrum member flanges 245.

In operation, manual rotation of the thrust member 232 in the same manner as described in the main embodiment, is transmitted from the pins 261 via their respective cutouts 247 to the pair of U-shaped fulcrum members 300 to dispose the same relatively in positions corresponding to those demonstrated by FIGURES 11 and 12 to produce a lighter or heavier pedal "feel" as required.

*Modified means for manually indexing the booster push-rod*

Figure 16:
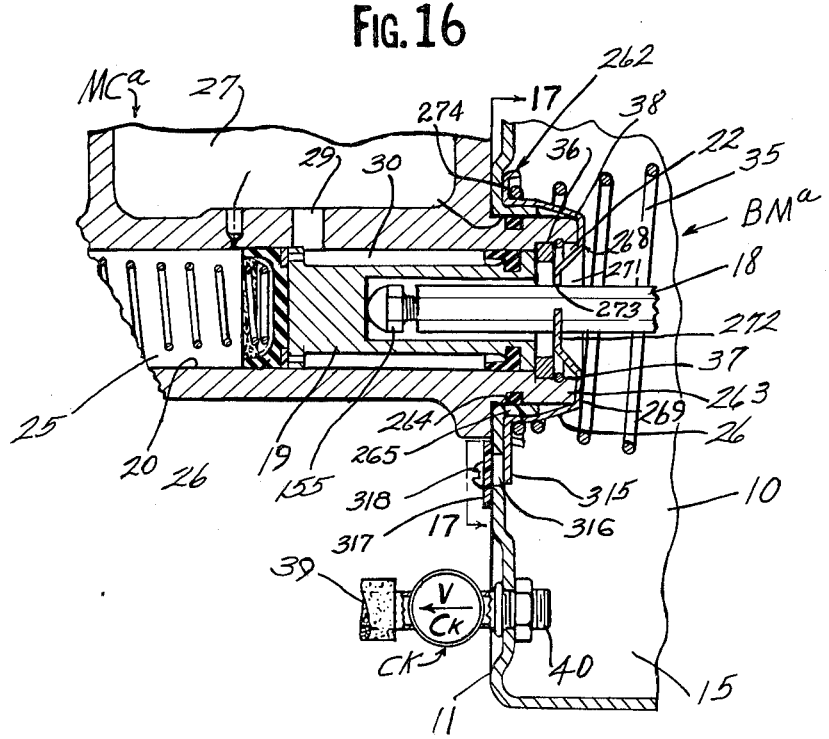
FIGURE 16 is another modification relating to the manual means for rotating the master cylinder push-rod and wherein the gear-drive connection is eliminated in favor of a pointer radially projecting from the push-rod rotating member, said pointer being exposed through an arcuate opening closed by a transparent cover through which the five settings are in view.
Figure 17:
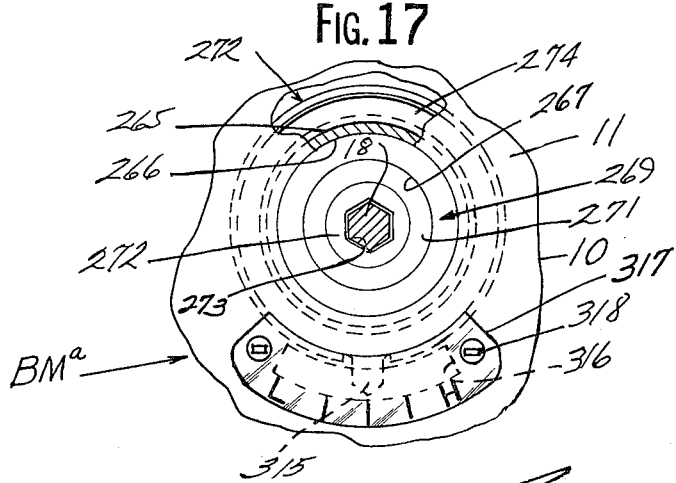
FIGURE 17 is a transverse section taken along the line 17—17 of FIGURE 16 to show the manually movable pointer and associated selective positions therefor exposed through the transparent cover of the arcuate opening.

FIGURES 16 and 17 illustrate a modified structure for manual rotation of the booster push-rod 18. This modification eliminates the dial 245 and gear segments 275, 276 for transmitting rotational movement to the cup-shaped rotatable member 262, in favor of a simple pointer 315 integrally projecting from the peripheral edge of the flange 274. As shown in FIGURE 17 this pointer is exposed through an arcuate opening (window) 316 in the end wall 11 of the power cylinder 10, below the mounting flange for the master cylinder MC, and a transparent cover plate 317 of arcuate configuration overlies the said opening and the graduations L to H defining the positions to which the pointer can be indexed to change the pedal "feel" from light to heavy and vice versa, said pattern of graduations lying along the lower marginal portion of said cutout and corresponds to those shown in the main embodiment (see FIGURE 9). The cover plate 317 is secured in airtight position by means of a pair of cap screws 318, and the transparency of said cover plate enables viewing the position of the pointer with respect to its different settings.

In operation, manual rotation of the hexagonal push-rod 18 may be effected by removing the cover plate and inserting a rod-like element through said cutout and thereby turn the rotatable member 262 to the desired setting, whereupon replacement of the transparent cover plate 317 by the two cap screws conditions the booster motor BM to operate with reaction feel on the pedal P in accordance with the established setting of the indexing pointer, such setting being visible through the window in the transparent cover defined by the configuration of the opening 316.

*Second modification of the adjustable fulcrum block assembly*

FIGURES 18, 19, 20 and 21 illustrate another modified form of the fulcrum block assembly "FBb," and wherein the pair of complemental fulcrum plates comprises rectangular segments 320, 321, respectively. The plate 320 is formed with the horizontal flange 245 at its outer end, and the lateral edges thereof 322, 323 define a pair of rearwardly projecting flanges 324, 325, respectively, best demonstrated in FIGURES 18 and 21, of sufficient length to provide a channel 326 for reception of the two fulcrum plates in contiguous overlying relation, and the pair of cooperating reaction levers 171 as shown in FIGURE 18. These flanges serve to maintain the two fulcrum plates and the two cooperating reaction levers in correct operating relationship as shown in FIGURES 18 and 19 so that the fulcrum plates can have only radial movement relative to each other and to their respective reaction levers 171. Each of the fulcrum plates is provided with a central vertically elongated opening 327 normally in coaxial relation as shown in FIGURE 19, and with respect to the axis of the cylindrical push-rod extension 234 which projects through said openings with opposite arcuate ends of said slots spaced from said extension, to accommodate relative rectilinear movement of the fulcrum plates away from and toward each other to the positions shown in FIGURES 11 and 12, respectively, of the main embodiment to provide light to heavy pedal "feel" as required.

Fulcrum plate 320 is provided with a rectangular slot 328 through the intermediate portion of the horizontal flange 245 on its outer end as shown in FIGURE 21. Also on opposite sides of the elongated opening in this plate is a pin clearance rectangular opening, 239 and a horizontally elongated slot 331, respectively, best shown in FIGURE 21. As shown in FIGURE 20, the pair of actuating pins carried by the thrust member 232 comprises one pin 261 the same length as used in the main embodiment, and a longer pin 333. The fulcrum plate 321 is provided with an elongated horizontal slot 334 normally in alignment with the corresponding slot 331 in the other fulcrum plate 320 as shown in FIGURE 19. Also the upper end of the plate 321 is defined by a narrow upstanding rectangular portion 335 which in the assembled status of the two fulcrum plates projects through the rectangular opening 328 in the flange 245 of the other fulcrum plate 320. This latter connection between the upstanding portion and opening serve to interlock the upper ends portions of the two fulcrum plates for relative radial movement as is understood. Similar to the construction of the upper end of the plate 320, is a horizontal flange 245 defining the lower end of the plate 321, said flanges 245 serving as the fulcrum pressure points for intermediate portions of the reaction levers 171.

In the assembled status of the fulcrum plates 320, 321 as shown in FIGURE 18, the pin 261 projects through the rectangular horizontal slot 331, to impart rectilinear movement to fulcrum plate 320, the rectangular opening 329 in plate 320 accommodating the sweep of the long pin 333, which engages slot 334 which is elongated to accommodate circumferential movement of the latter pin in response to rotation of the thrust member 232. The long pin 333 projects through the opening 329 directly into the horizontal slot 334 in the fulcrum plate 321 to impart simultaneous radial movement to the latter relative to the other plate.

In operation, manual rotation of the thrust member 232 in the same manner as described in the main embodiment, is transmitted from the pins 261, 333 via the horizontal slots 331, 334, respectively, to impart radial relative movements to the two fulcrum plates 320, 321, respectively, away from and toward each other to dispose the same in positions corresponding to those demonstrated by FIGURES 11 and 12 to produce a lighter or heavier pedal "feel" as required.

Thus, it is seen from the foregoing description of the structural and operational nature of my invention, that my novel and adjustable reaction-transmitting device RD forming the subject matter of the present application includes ratio-changing means by shifting the position of the fulcrum pressure point relatively to the reaction levers 171, that power-brakes can with the present invention embodied, be furnished for all makes of cars, with the pedal "feel" selectively adjustable to suit the driver as well as compensate for operating characteristics of a particular type of braking system. For example, for systems which incorporate servo-action in the wheel brake assembly. Furthermore, this pedal "feel" selector enables power-brakes to be produced and standardized on motor vehicles with complete seller (car dealer) and owner confidence. Also another special advantage of great importance is that pedal height may be increased somewhat for more mechanical leverage therefore resulting in improved control of the power-booster unit, in relation to what is termed in the industry a "low-pedal," to provide the driver with added safety in the event of booster failure.

Power-brakes as presently produced are provided with a built-in reaction feel which cannot be changed. A great many car buyers are reluctant to purchase a power-brake when taking delivery of their new car, due to much publicized oversensitivity as characterizing power-brakes. Oversensitivity means lack of predictable control over the power-booster unit with consequent erratic and sometimes even dangerous braking application. Many car dealers refuse to order power-brakes with their new car requirements because of possible adverse reaction from the car buyer, thus avoiding customer dissatisfaction.

The present novel pedal "feel" control enables any power-brake unit which reaches the car dealer's floor as original equipment, or when such units are sold as an after-market accessory, to be adjusted without dismantling, or otherwise change the working parts of the reaction device RD, to suit the particular customer's choice as to the degree of pedal "feel" he desires for his power-brake unit. Even the car owner himself can make such adjustment by merely changing the position of the dial 282, after taking delivery of his new car, so that all members of the family who drive may have a compromised setting of reaction "feel" to gain the maximum of pleasure and safety afforded by power-braking.

In connection with the modified composite fulcrum blocks FB$^a$ and FB$^b$ illustrated in FIGURES 13 and 18, respectively, it should be noted that these modified components are adapted as shown for control by the modified dialing arrangement disclosed in FIGURES 16 and 17, however, either of these modified blocks may be readily associated with the selector dial 282 of the main embodiment by the mere transposition of the fulcrum plates 300 of the FIGURE 13 modification, or by transposing the fulcrum plates 320, 321, so that the disposition of the cutouts 247 in either modification with respect to their cooperating actuating pins 261, corresponds to that of FIGURE 6 wherein counterclockwise rotation of the push-rod 18, as viewed when looking toward dial 282, is converted into relative radial displacement of the fulcrum plates 243 to increase the radial distance of the flanges from the axis of said push-rod thereby producing lighter pedal-feel, while clockwise rotation of the pointer 315 in FIGURE 17 in relation to the composite fulcrum blocks FB$^a$ and FB$^b$, directly rotates the push-rod 18 in the same direction to produce such lighter pedal operation.

A preferred embodiment and three modifications thereof have been illustrated and described, and which are believed well calculated to fulfill the objects above stated. However, it is obvious that modifications, variations, changes and substitutions may be made in the illustrated arrangement of the cooperating elements constituting the invention in the commercializing process thereof without departing from the proper scope or fair meaning of the subjoined claims.

Having thus described my invention, I claim:

1. A reaction-transmitting mechanism adapted for use in a pressure differential motor having a housing, a pressure-responsive power member movable in said housing, an output member acted on by said power member, valve means having cooperating fluid-controlling portions carried, respectively, by said power member and a personally-controlled input member, said control portions being relatively movable to control differential pressures on said power member to move the same, a pressure area associated with said power member, a pressure area associated with said input member, and which is radially spaced from said first-named pressure area, the improvement which comprises: a fulcrum member axially movable as a unit with said output member and having a pressure area radially spaced in offset parallel relationship intermediately of said pressure areas associated with said power and input members, respectively, said fulcrum member being characterized by radial rectilinear movement relative to the axis of said output member; mechanical connecting means operatively incorporated between said fulcrum and output members for converting rotary movement of the latter member into rectilinear movement of the former member to change the leverage-ratio effective between the fulcrum pressure area and the pressure areas associated with said power and input members, respectively; a reaction lever disposed contiguously to the pressure areas associated with said power and input members, respectively, on one side of the lever, and the fulcrum pressure area on the other side of the lever; and manually-rotatable means for imparting rotary movement to said output member to selectively effect rectilinear movement of the fulcrum member relative to said power and input members, and thereby correspondingly modifying the division of force exerted by the power and input members on said output member.

2. A reaction-transmitting mechanism adapted for use in a pressure differential motor having a housing, a pressure-responsive power member movable in said housing, an output member acted on by said power member, valve means having cooperating fluid-controlling portions carried, respectively, by said power member and a personally-controlled input member, said control portions being relatively movable to control differential pressures on said power member to move the same, a plurality of pressure areas associated with said power member, a like-number of pressure areas associated with said input member, and which are radially spaced in alignment with said first-named pressure areas, the improvement which comprises: a composite fulcrum block axially movable as a unit with said output member and comprising a like-number of fulcrum members provided with a corresponding number of pressure areas, respectively, radially spaced in offset parallel relationship intermediately of the pressure areas associated with said power and input members, respectively, said fulcrum members being characterized by radial rectilinear movement relative to one another and to the axis of said ouput member; a corresponding number of radially arranged reaction levers which are contiguously disposed, respectively, to each pair of radially aligned pressure areas associated with said power and input members, respectively, on one side of each lever, and the radially aligned fulcrum pressure areas intermediately positioned on the other side of each lever; mechanical connecting means operatively incorporated between said fulcrum and output members for converting rotary movement of the latter member into such rectilinear movement of the former member to change the leverage-ratio effective between the fulcrum pressure areas and the pressure areas associated with said power and input members, respectively, and manually-rotatable means for imparting rotary movement to said output member to selectively effect such rectilinear movement of said fulcrum members relative to said power and input members, and thereby correspondingly modifying the division of force exerted by the power and input members on said output member.

3. A reaction-transmitting mechanism adapted for use in a pressure differential motor having a housing, a pressure-responsive power member movable in said housing, an output member acted on by said power member, valve means having cooperating fluid-controlling portions carried, respectively, by said power member and a personally-controlled input member, said control portions being relatively movable to control differential pressures on said power member to move the same, a plurality of pressure areas associated with said power member, a like-number of pressure areas associated with said input member, and which are radially spaced with respect to said first-named pressure areas, the improvement which comprises: a blind axial bore in said input member; a cylindrical extension having an end portion projecting coaxially from said ouput member into said blind bore and normally spaced predeterminately from the blind end of said bore; an annular flange fixed on said extension to have unitary rotational and axial movements therewith; a composite fulcrum assembly axially movable as a unit with said output member, and comprising a plurality of fulcrum elements having radial rectilinear movement in the same plane relative to one another and to the axis of said output member, the central portions of said fulcrum elements being juxtaposed with respect to said annular flange for axial movement as a unit therewith; an elongated central opening defined by the assembled status of said fulcrum elements, and through which said extension passes in spaced relation to opposite ends of said opening; a corresponding number of pressure areas defining the outer ends of said fulcrum elements, respectively, in offset parallel relationship to the aforesaid pressure areas associated with said power and input members, respectively; a like-number of mechanical connections operatively incorporated between said annular flange and said fulcrum elements, respectively, for converting rotary movement of said flange into such rectilinear movements of said fulcrum elements; a like-number of lever-type reaction members disposed contiguously to each pair of pressure areas associated with said power and input members, respectively, on one side of each reaction member, and to their corresponding fulcrum areas intermediately positioned on the other side of each reaction member; and manually-rotatable means for imparting rotary movement at will to said output member to selectively effect such rectilinear movements of said fulcrum elements relative to the intermediate positions of said reaction members whereat the division of reactive pressure transmittable by said output member to said power and input members, is defined by the leverage-ratio effective between the pressure areas on said fulcrum elements, respectively, and the pressure areas associated with said power and input members, respectively.

4. A reaction mechanism constructed in accordance with claim 3 in which said fulcrum elements comprise: a pair of complemental L-shaped plates, each having a base segment provided at its outer end with a horizontal flange normal thereto, said flange defining the fulcrum area engageable by the intermediate portion of its cooperating reaction member, and an elongated narrow vertical segment projecting from the base segment and provided with a cutout indented in its inner edge substantially intermediately thereof with its outer vertical edge flush with the outer edge of said base segment; a guide member of rectangular configuration provided with a pair of forwardly extending flanges defining intermediate portions, respectively, of its vertical edges, and a pair of upper and lower flanges projecting rearwardly from said edges defining the upper and lower end portions, respectively, thereof; a channel defined by said forward flanges for reception of said annular flange; a pair of upper and lower channels defined by the spaces obtaining between said pairs of upper and lower rear flanges, respectively, for reception of said L-shaped fulcrum plates in assembled status and said pair of cooperating reaction members;

and a central opening in said guide member through which said output member extension passes to support the latter member in operative position between the L-shaped fulcrum members and said cooperating pair of reaction members to stabilize the fulcrum and reaction members in cooperable operative relationship.

5. A reaction mechanism constructed in accordance with claim 4 in which said mechanical connections comprise: a pair of diametrically opposed pins projecting from the face of said annular flange fixed on the output member extension and co-rotational therewith, said pins being adapted to project into engagement with said cutouts in said vertical segments, respectively, whereby rotary movement of said output member and annular flange as a unit imparts relative radial movements to the two fulcrum plates to change the radial distance of the horizontal flanges defining their top and bottom ends, respectively, and their respective pressure areas, relatively to the intermediate portions of said reaction members to thus proportionally vary the division of work between said personal and power members.

6. A reaction mechanism constructed in accordance with claim 3 wherein said manually-rotatable means comprise: a longitudinally stabilized cup-shaped member coaxially disposed with respect to said output member, and which is characterized by rotary movement, and having an annular outstanding flange defining the open end thereof, with the opposite end closed by a wall; a central aperture in the said end wall through which said output member passes, said aperture providing a connection with said output member effective to impart co-rotational movement to the latter member and cup-shaped member and accommodating relative rectilinear movements of said output member with respect to said cup-shaped member; a gear segment defining a portion of the circular peripheral edge portion of said outstanding flange; a sector-type gear plate mounted for rotation on one end of a shaft parallelly spaced from said output member, and disposed in constant meshing engagement with said gear segment; a fixed support member for rotatably supporting said cup-shaped member and shaft in parallelly spaced relationship; and a knob-like dial provided with a finger-piece pointer fixed on the other end of said shaft, to facilitate manual rotational indexing of the dial to a plurality of graduations displayed in an arcuate pattern radially spaced from the finger-piece pointer to selectively establish said different graduations by rotating said output member and thereby radially moving the fulcrum plates away from and toward each other from normal position to correspondingly change the reaction pressure effective on said personal member.

7. A reaction mechanism constructed in accordance with claim 3 wherein said manually-rotatable means comprise: a longitudinally stabilized cup-shaped member coaxially disposed with respect to said output member, and which is characterized by rotary movement, and having an annular outstanding flange defining its open end with the opposite end closed by a wall; a central aperture in said end wall through which said output member passes, said aperture providing a connection with said output member effective to impart co-rotational movement to the latter member and cup-shaped member and accommodating relative rectilinear movements of said output member with respect to said cup-shaped member; a fixed member for rotatably supporting said cup-shaped member; an opening in said fixed member; a pointer projecting radially from a portion of the peripheral edge of said outstanding flange and extending in view through said last-defined opening; and a plurality of graduations on said fixed member in arcuate relationship to the lower edge of said last-defined opening and radially offset from the end of said pointer whereby manual rotation of said pointer to said different graduations rotates the output member correspondingly to radially move the fulcrum plates relatively away from and toward each other from normal position to change the reaction pressure effective on said personal member.

8. A reaction mechanism constructed in accordance with claim 3 in which said fulcrum elements comprise: a pair of complemental U-shaped plates, each plate having a horizontal base segment provided at its outer end with a horizontal flange normal thereto, said flange defining the fulcrum area engageable by the intermediate portion of its cooperating reaction member, and a wide and narrow elongated segment projecting vertically from the inner end of said base segment in parallelly spaced relation with respect to each other, with the wide segment having said cutout offset coextensively with respect to the plate, along its vertical marginal edge portion to accommodate overlapping juxtaposed relationship of the narrow segment on the othe plate whereby said plates in assembled status produce a rectangular configuration defined by the narrow and wide segments of the plates in overlapping relationship; and an overhanging portion of the horizontal flange offset from the base segment through which the free end of the overlapping narrow segment passes to thereby interlock the free ends of said narrow segments behind said overhanging portions to stabilize said plates when moved relatively; and a rectangular guide member having a rectangular vertical segment with opposite vertical edges thereof defined by a pair of rearwardly projecting flanges provided with offset extensions, respectively, defining the free ends thereof; a channel of rectangular configuration defined by the vertical segment and offset flanges for stabilizing the pair of U-shaped plates in assembled relatively movable status; another channel longitudinally spaced rearwardly of said first-defined channel defined by the free end portions of said offset flanges for reception of said pair of reaction members, to maintain radial alignment of the pair of U-shaped plates in cooperative relationship to their respective reaction members; a central opening in the vertical segment through which said output member extension passes to support the latter member in operative position between the aforesaid annular flange and pair of wide segments disposed in a common plane thereagainst, and a pair of arcuate openings in said vertical segment, one on each side of the aforesaid opening therein.

9. A reaction mechanism constructed in accordance with claim 8 in which said mechanical connections comprise: a pair of pins projecting from the face of the aforesaid annular flange fixed on said output member extension, said pins being adapted to project through said arcuate openings and engage the aforesaid cutouts, respectively, in said wide segments whereby rotary movement of said output member and annular flange as a unit imparts relative radial movements to the two fulcrum plates to change the distance between the horizontal flanges defining the top and bottom ends, respectively, thereof and their respective pressure areas, relatively to the intermediate portions of said reaction members to thus proportionally vary the division of work performed by the personal and power members.

10. A reaction mechanism constructed in accordance with claim 3 in which said fulcrum elements comprise: a pair of fulcrum plates in contiguous overlapping relationship and having substantially similar rectangular segments, respectively, with the top and bottom ends formed as horizontal flanges, respectively, normal thereto and the vertical edges of one of the plates being defined by a pair of spaced rearwardly projecting flanges, respectively, to provide a channel for reception of the other fulcrum plate in assembled overlapping status to present the fulcrum areas on their horizontal flanges, respectively, for engagement by intermediate portions of their respective cooperating reaction members; a pair of elongated centrally disposed openings in said rectangular segments, and through which said output member extension passes in spaced relation to opposite ends of said openings normally in registry; a slot intermediately positioned through the horizontal flange on said one fulcrum plate; an upstanding rectangular projection defining the intermediate portion of the upper end of the rectangular segment of said other fulcrum plate, and which passes through the slot in said horizontal flange to interlock the upper ends of both fulcrum plates for relative radial movements in said channel thereby preventing fortuitous separation of said fulcrum plates; an arcuate vertically disposed slot on one side of the opening in the rectangular segment of said one fulcrum plate; a horizontally disposed elongated opening in the rectangular segment of said one fulcrum plate on the other side of said opening therein; and another horizontally disposed elongated opening in the rectangular segment of the other fulcrum plate opposite to the aforesaid horizontal opening in the said one fulcrum plate.

11. A reaction mechanism constructed in accordance with claim 10 in which said mechanical connections comprise: a short and a long pin projecting from the face of the aforesaid annular flange fixed on said output member extension, said short pin being adapted to project directly into the horizontal opening in said one fulcrum plate, and then passing through the arcuate opening in said one fulcrum plate into engagement with the horizontal opening in the other fulcrum plate, said arcuate opening accommodating a predetermined rotational movement of said annular flange whereby rotary movement of said output member and annular flange as a unit imparts relative radial movements to the two fulcrum plates to change the distance between the horizontal flanges defining the top and bottom ends, respectively, thereof and their respective pressure areas, relatively to the intermediate portions of said reaction members whereby the division of work performed by said personal and power members is varied proportionally.

12. In reaction-transmitting mechanism adapted for use in cooperation with an axially and rotatably movable thrust element to axially transmit reaction when jointly acted on by a pair of cooperable actuatable members, with one of members being effective to control the other member, the improvement which comprises: a member movable as a unit with said one actuatable member; a pressure area operatively associated with said movable member; a pressure area operatively associated with the other actuatable member and disposed in radially spaced relationship to the first-defined pressure area; a fulcrum member having a pressure area offset from and in parallel relationship to the two aforesaid pressure areas, and which is mounted on said thrust element to move axially as a unit therewith, and relatively radially to the axis thereof; a reaction lever arranged contiguously with respect to the two first-defined pressure areas on one side of the lever and the fulcrum area being disposed intermediately of the other side of said lever; an operative mechanical connection incorporated between said thrust element and said fulcrum member for converting rotary movement of said thrust element into relative radial movements of said fulcrum member to enable the said fulcrum area to selectively engage different intermediate portions on said reaction lever, and thereby modifying the division of work performed jointly by said actuatable members on said thrust element in accordance with the effective leverage-ratio; and manual means for imparting rotary movement to said thrust element and accommodating relative axial movement thereof.

13. In reaction-transmitting mechanism adapted for use in cooperation with a work-performing element axially and rotatable movable, axial movement thereof being effective to transmit reaction from said element when acted on jointly by a pair of cooperable actuatable members, with one of said members being effective to control the other member, the improvement which comprises: a working portion associated with each of said actuatable members, in radially spaced relation; a composite fulcrum assembly axially movable as a unit with said work element and having a pair of elements relatively movable radially with respect to each other and to the axis of said work element, and the outer opposite ends thereof defining working portions, respectively; a pair of reaction-transmitting members rockably disposed between said working portions on said fulcrum elements on one side of said reaction members and radially spaced working portions on the other side of said reaction members on said actuatable members, respectively, whereby reaction imparted by axial movement of said work element to said fulcrum elements is transmitted to said actuatable members substantially proportionally in accordance with the spacing of the working portions on said fulcrum elements which react on an intermediate portion of said reaction members; manually-rotatable means for imparting rotational movement to said work element to change the spacing of said working portions on said fulcrum elements, respectively; and mechanical connecting means operatively incorporated between said work element and said fulcrum assembly for converting rotational movement of said work element into relative radial movements of said fulcrum elements to change the effective position of said intermediate portion of said reaction members on said fulcrum working portions whereby the division of work performed by said actuatable members is proportionally varied.

14. In reaction-transmitting mechanism adapted for use in cooperation with a work-performing element axially and rotatably movable, axial movement thereof being effective to transmit reaction from said element when acted on jointly by a pair of actuable members, with one of said members being effective to control the other member, the improvement which comprises: a working portion on each of said actuable members, and disposed in radially spaced relationship; a composite fulcrum assembly axially movable as a unit with said work element, and having at least a pair of diametrically opposed elements, relatively movable radially with respect to the axis of said work element, the outer ends of said fulcrum elements being provided with working portions, respectively, offset from and disposed intermediately of the first-defined working portions on said actuatable members; a pair of reaction-transmitting members rockably disposed between said working portions on the actuatable members on one side, and the working portions on the fulcrum elements on the other side whereby the latter working portions cooperate with intermediate portions on said reaction members during reaction transmission thereby; manually-rotatable means for imparting rotational movement to said work element to change the effective radial spacing of the working portions on said fulcrum elements, respectively; and mechanical connecting means operatively incorporated between said work element and said fulcrum elements to convert rotational movement of said work element into relative radial movements of said fulcrum elements and thereby changing the effective radial spacing of the latter elements to engage different intermediate portions of said reaction members with said fulcrum working portions whereby the division of work performed by said actuatable members is proportionally varied.

15. In a booster-type power unit having a chamber enclosure and a movable wall dividing said chamber into a pair of opposing power chambers, a source of power, a work-performing element movable in part by said wall, and an operator-operated member operable from a normally released position to actuate one of the elements of a pair of control elements relatively movable in follow-up relation to control said wall, the improvement which comprises: adjustable reaction-transmitting mechanism comprising working portions associated with said wall and said one control element, respectively, and which are disposed in radially spaced relationship; a composite fulcrum assembly axially movable as a unit with said work element, and including a pair of elements relatively movable radially to each other and to the axis of said work element, with the outer ends of said assembly defining working portions, respectively; a pair of reaction-transmitting members rockably disposed on one side contiguously to said working portions on said fulcrum elements, and the other side of said last-defined members being contiguously disposed with respect to the radially spaced working portions associated with said wall and said one control element, respectively, whereby reaction imparted by axial movement of said work element to said fulcrum elements when under influence of said wall and operator member, is transmitted to said wall and said one control element substantially proportional in accordance with the relative spacing of the working portions on said fulcrum elements which react on an intermediate portion of said reaction members; manually-rotatable means for imparting rotational movement to said work element to change the spacing of said working portions on said fulcrum elements, respectively; and mechanical connecting means operatively incorporated between said work element and said fulcrum assembly for converting rotary movement of said work element into relative radial movements of said fulcrum elements to change the effective positions of said fulcrum working portions on said intermediate portions of said reaction members whereby the division of work performed by said wall and operator member is correspondingly varied.

16. A booster-type power unit constructed in accordance with claim 15 wherein the said power unit is a pressure differential operated booster motor.

17. A booster-type power unit constructed in accordance with claim 16 wherein said pair of control elements comprises the control valve unit for said movable wall, and wherein the one valve element is normally spaced coaxially from said work element to provide relative follow-up cooperation of said control valve elements, and upon said relative movement being taken up, said one valve element directly engages said work element to provide a "straight-through" operation of the latter element under operator actuation of said operator member in cooperation with said movable wall or independently thereof in the event the latter becomes inoperative.

18. In a fluid pressure booster-type motor comprising a casing having a pressure-responsive unit movable therein from normal position and which divides the interior of said casing into a constant pressure chamber and a variable pressure chamber, the former chamber being connected to a source of pressure different from atmosphere, the improvement which comprises: follow-up control valve mechanism mounted in part on said unit, said valve mechanism comprising an outer valve element characterized by a tubular wall; an elongated valve actuator including a cylindrical valvular portion in interfitting relationship with respect to said tubular valve element; complemental working surfaces between said tubular element and said valvular portion; an internal annular variable pressure valve chamber indented in the working surface on the tubular valve element and having continuous communication with said source of pressure; conduit means incorporated between said pressure-responsive unit and said tubular valve element for normally connecting said constant pressure chamber and said valve chamber; a fluid control channel transversely incorporated through a portion of the wall of said tubular valve element; a pair of cooperating working lands on said tubular valve element and said valvular portion, respectively, said lands being defined by portions of said working surfaces and normally spaced from each other to establish communication via said conduit means between said constant pressure chamber and said first-defined variable pressure chamber; an air slot transversely incorporated in the working surface on said valvular portion and which is longitudinally spaced from the said working land thereon, said air-slot being normally out of registry with the aforesaid fluid control channel when said working lands are in normally spaced relationship; an air passage system incorporated in said valve actuator for maintaining air at atmospheric pressure in said fluid control channel; longitudinally disposed bracket means mounted on said pressure-responsive unit wholly within said variable pressure chamber for stabilizing the said tubular valve element to have axial unitary movement with said pressure-responsive unit, and to accommodate limited relative axial movement of said tubular valve element as a unit with said valve actuator; a pair of cooperable abutment-engaging portions on said bracket means and tubular valve element, respectively, for defining their relative normal positions, when engaged; another pair of cooperable abutment-engaging portions on said bracket means and motor casing, respectively, for defining the normal position of said pressure-responsive unit, when engaged; spring activated sealing means incorporated between said motor casing and said valve actuator to prevent leakage from said constant and variable pressure chambers to the exterior of said motor casing, and to bias said valve actuator toward normal position; an operator-operated means operatable from normal position to displace said valve actuator relatively from its normal position, to said tubular valve element to selectively close the space between said working lands as a function of disposing them in overlapping relationship, and placing said air-slot in communication with said atmospheric channel and thereby creating a differential pressure with said constant and variable pressure chambers effective to activate said pressure-responsive unit to perform work; a reduced diameter portion defining the forward end portion of said valve actuator; an opening through the central portion of said pressure-responsive unit through said reduced diameter portion passes to have sliding movement between predetermined limits thus serving as a support therefor; a blind axial bore in said reduced diameter portion; an elongated hexagonal work-performing element having an outstanding thrust flange intermediately thereof and which is slidably supported in sealed relationship in a secondary opening coaxial with said first-defined opening in said pressure-responsive unit; a cylindrical extension projecting rearwardly from said thrust flange into said blind axial bore, in normal predeterminately spaced relationship to the bottom of said blind axial bore, to define the aforesaid predetermined limits of movement of said valve elements, and to provide a "straight-through" operator-actuation of said work element upon said predetermined movement being fully taken up wherein the end of said extension is in abutting relationship with respect to the bottom of said blind bore; adjustable reaction-transmitting lever mechanism comprising a composite fulcrum block having a plurality of elements relatively movable radially with respect to each other and to the axis of said work element, said fulcrum block being disposed contiguously to said thrust flange on the work element, and in offset relationship with respect to the plane of a like-number of cooperating reaction levers engageable at their opposite ends with radially spaced portions on said pressure-responsive unit and said reduced portion on said valve actuator, respectively, whereby said fulcrum elements, pressure-responsive unit and valve actuator are interconnected for transmitting reaction from said work element substantially proportional to the work performed by said pressure-responsive unit and valve actuator in accordance with the leverage-ratio defining the adjusted relative positions of said fulcrum elements; a pin and slot connection incorporated between said thrust flange on the work element and said fulcrum elements for converting rotary movement of said work element into relative radial movements of said fulcrum elements to change the spacing of the working portions defining the outer ends of said fulcrum elements, respectively, for selective engagement at different effective intermediate portions on said reaction levers; a rotatable cup-shaped member coaxial with said work element, and which is provided with an aperture complemental to the hexagonal cross section of said work element to provide co-rotational movement thereof and accommodate relative rectilinear movement of said work element to perform its work under joint influence of said operator member and said pressure-responsive unit; and manually-rotatable means including a dial on the exterior of said motor casing for imparting rotary movement to said cup-shaped member and work element to selectively index said fulcrum elements to a plurality of relatively spaced radial positions to change said leverage-ratio of said reaction levers and thereby modifying the division of work performed by said operator member and pressure-responsive unit to produce light to heavy reaction from said work element on said operator member.

19. A reaction-transmitting mechanism adapted for use in a pressure differential motor having a manual input member, a pressure-responsive power member, an output member activatable in part by said power member, valve means having cooperable fluid-controlling portions operatively effective between said input and power members, respectively, for controlling the latter member, a pressure area associated with said input member, a pressure area associated with said power member and which is radially spaced from said first-defined area, comprising a fulcrum member axially movable with said output member as a unit, and radially displaceable relatively with respect to the latter member, and having a pressure area intermediate the first- and second-defined areas; mechanism operable for converting rotary movement of said output member into radial movement of said fulcrum member to change the leverage-ratio effective between the aforesaid three pressure areas; a reaction member having one side contiguous to the pressure areas on said input and power members, and its other side being contiguous to the pressure area of said fulcrum member; and manually-rotatable means for imparting rotary movement to said output member to selectively establish different radial positions of said fulcrum member relative to said output member for correspondingly modifying the division of force applied by said input and power members to said output member.

20. A reaction-transmitting mechanism adapted for use in a pressure differential motor having a manual input member, a pressure-responsive power member, an output member activatable in part by said power member, valve means having cooperable fluid-controlling portions operatively effective between said input and power members, respectively, for controlling the latter member, a pressure area associated with said input member, a pressure area associated with said power member and which is radially spaced from said first-defined area, comprising a fulcrum member axially movable with said output member as a unit, and radially displaceable relatively with respect to the latter member, and having a pressure area intermediate the first- and second-defined areas; a reaction member having one side contiguous to the pressure areas of said input and power members, and its other side being contiguous to the pressure area of said fulcrum member; and manually-rotatable means including a mechanical connection to said fulcrum member for selectively effecting relative displacement of the latter member to different radial positions to change the leverage-ratio effective between the aforesaid three pressure areas, and thereby correspondingly modifying the division of force applied by said input and power members to said output member.

21. A reaction-transmitting mechanism for use in cooperation with a power device having a source of power, a movable power member and a power control therefor, a thrust reactive member acted on in part by said power member, and a manual member for controlling in part said power control, comprising reaction-transmitting means including a movable member characterized by spaced portions acted on by said manual and power members, respectively, and an intermediate portion acting on said thrust member, to produce a lever-action therebetween; and manually-controllable means including an element movable relatively to said movable member for changing the leverage-ratio at will between said movable and thrust members.

22. A reaction-transmitting mechanism for use in cooperation with a thrust reactive member capable of transmitting reaction when acted on jointly by a pair of actuatable members, with one of said actuatable members being effective to control the other of said members, comprising reaction-transmitting means including a movable member characterized by spaced portions acted on by said actuatable members, respectively, and an intermediate portion acting on said thrust member, to produce a lever-action therebetween; and manually-controllable means including an element movable relatively to said movable member for changing the leverage-ratio at will between said movable and thrust members.

References Cited by the Examiner
UNITED STATES PATENTS

| | | | |
|---|---|---|---|
| 2,143,537 | 1/39 | Bliss | 74—104 |
| 2,989,870 | 6/61 | Stahl | 74—109 |
| 3,009,445 | 11/61 | Wuellner. | |
| 3,018,669 | 1/62 | Bennett | 74—109 |
| 3,033,173 | 5/62 | Bauman. | |

FRED E. ENGELTHALER, *Primary Examiner.*

RICHARD B. WILKINSON, *Examiner.*